United States Patent [19]

Thiebaut et al.

[11] Patent Number: 5,221,515
[45] Date of Patent: Jun. 22, 1993

[54] METHOD FOR MANUFACTURING GRIDS FOR A NUCLEAR FUEL ASSEMBLY

[75] Inventors: Bernard Thiebaut, Peyrins; Dominique Duthoo; Jean J. Germanaz, both of Romans; Bernard Angilbert, Crepol, all of France

[73] Assignee: Franco-Belge de Fabrication de Combustible, Courbevoie, France

[21] Appl. No.: 892,482

[22] Filed: Jun. 3, 1992

Related U.S. Application Data

[63] Continuation of Ser. No. 695,905, May 6, 1991, abandoned.

[30] Foreign Application Priority Data

May 7, 1990 [FR] France ............................ 90 05730

[51] Int. Cl.⁵ ............................................. G21C 21/00
[52] U.S. Cl. ............................... 376/261; 219/121.64; 219/121.78
[58] Field of Search .......................... 376/260, 261; 976/DIG. 81, DIG. 282; 219/121.63, 121.64, 121.78, 121.86; 228/181, 182, 183; 29/906

[56] References Cited

U.S. PATENT DOCUMENTS

| | | | |
|---|---|---|---|
| 4,501,949 | 2/1985 | Antol et al. | 219/121.63 |
| 4,636,606 | 1/1987 | Chastanet et al. | 219/121.63 |
| 4,680,443 | 7/1987 | Vere et al. | 219/121.64 |
| 4,710,606 | 12/1987 | Soroka et al. | 219/121.78 |
| 4,973,819 | 11/1990 | Thatcher | 219/121.78 |

*Primary Examiner*—Daniel D. Wasil
*Attorney, Agent, or Firm*—Pollock, Vande Sande & Priddy

[57] ABSTRACT

A method and a device for manufacturing a grid for use in a nuclear reactor fuel assembly. A grid whose component parts are to be mutually welded is placed in a holding frame having passages for access to points to be welded on two major faces and on the sides. The frame containing the grid is gripped with a device in a chamber where an inert gas atmosphere is generated. Welding is carried out on one face of the grid at a time using a laser beam penetrating from outside the chamber and the welding operations are repeated on the other faces. During welding on one face, the laser beam is moved in two mutually orthogonal directions while the frame is held stationary. The apparatus may include two chambers each with a gripping device, one for welding the two major faces and the other for welding the sides.

6 Claims, 9 Drawing Sheets

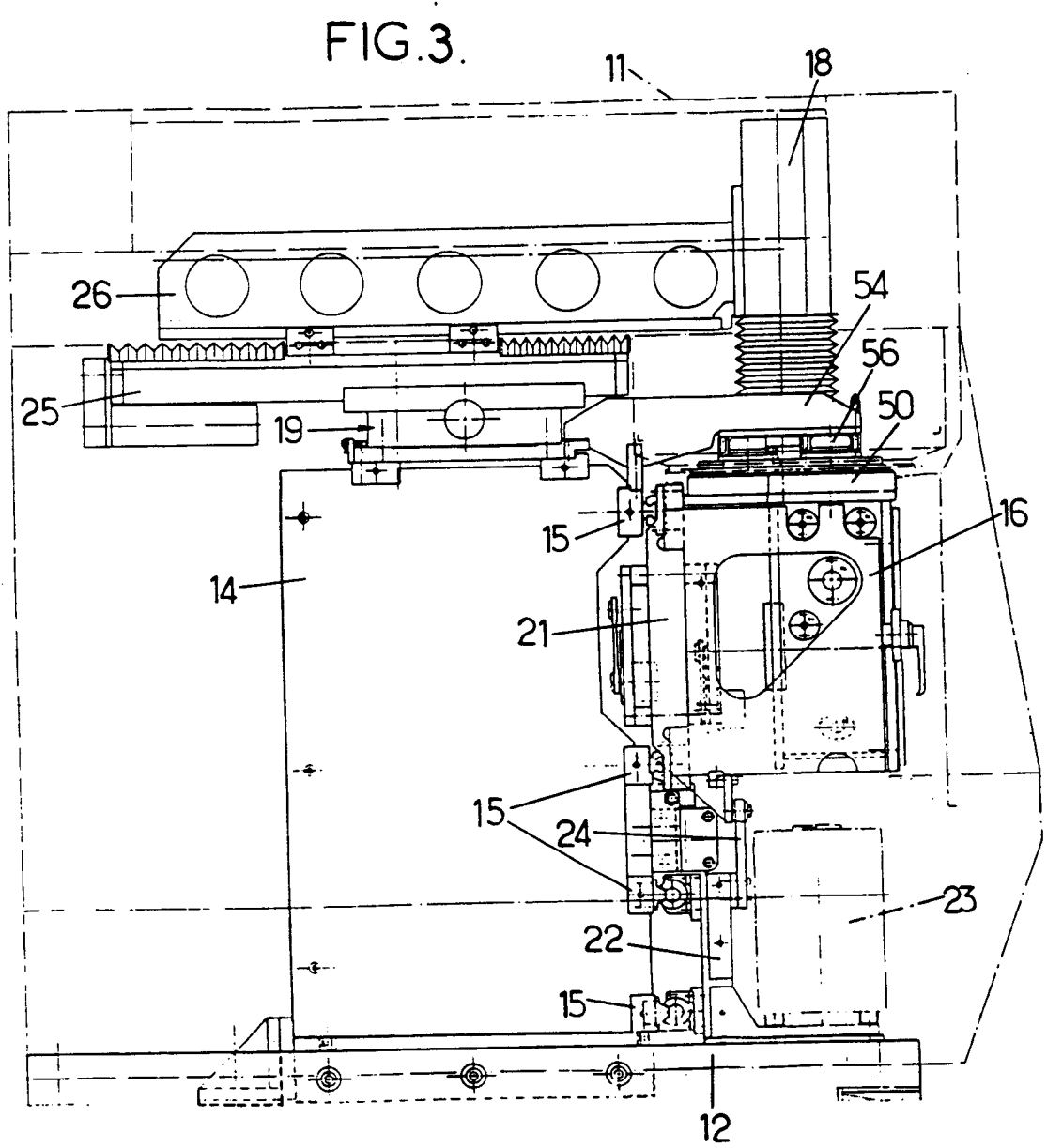

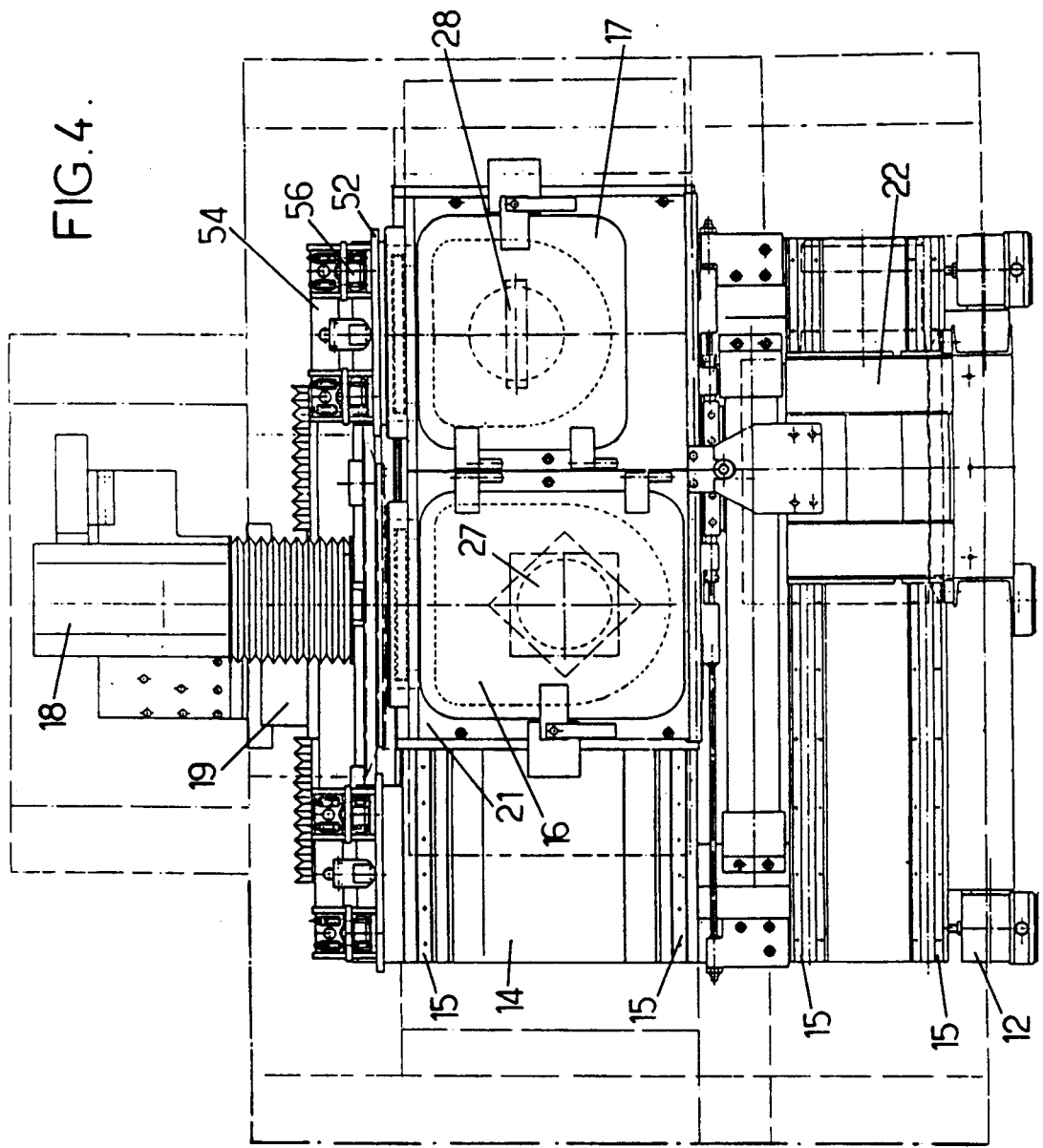

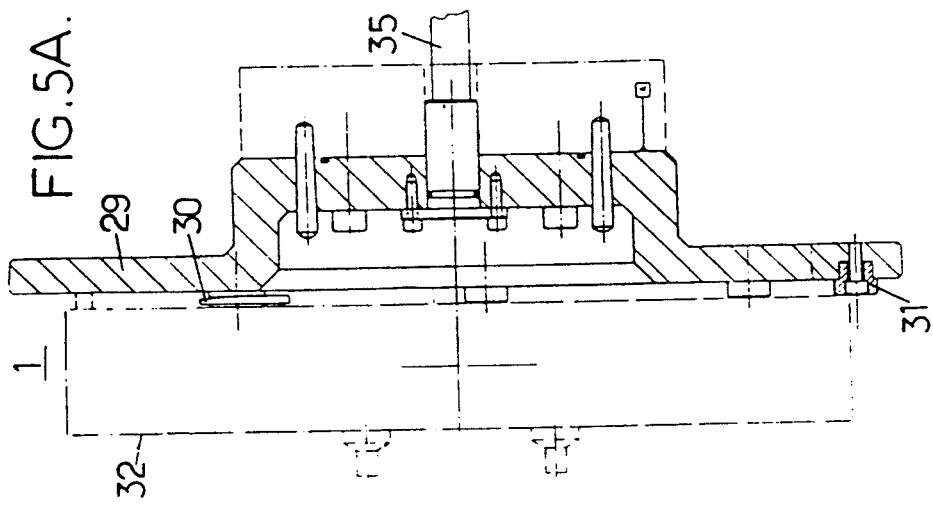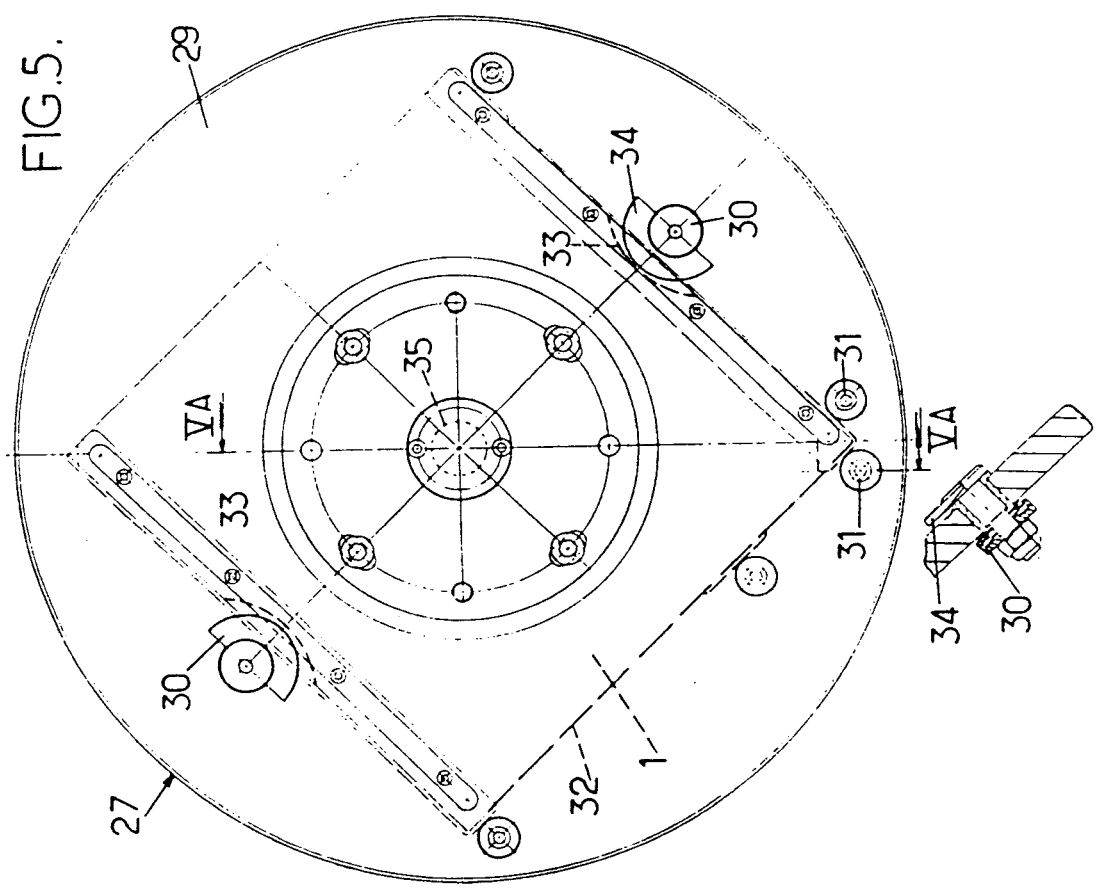

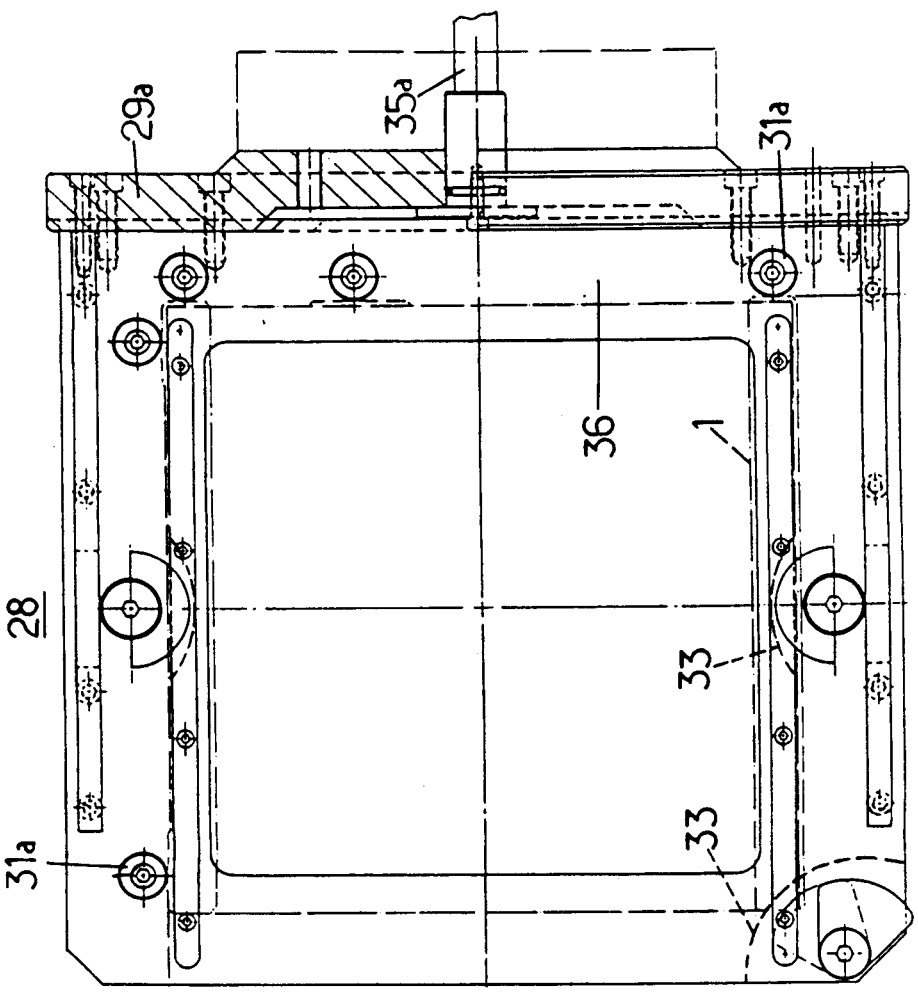
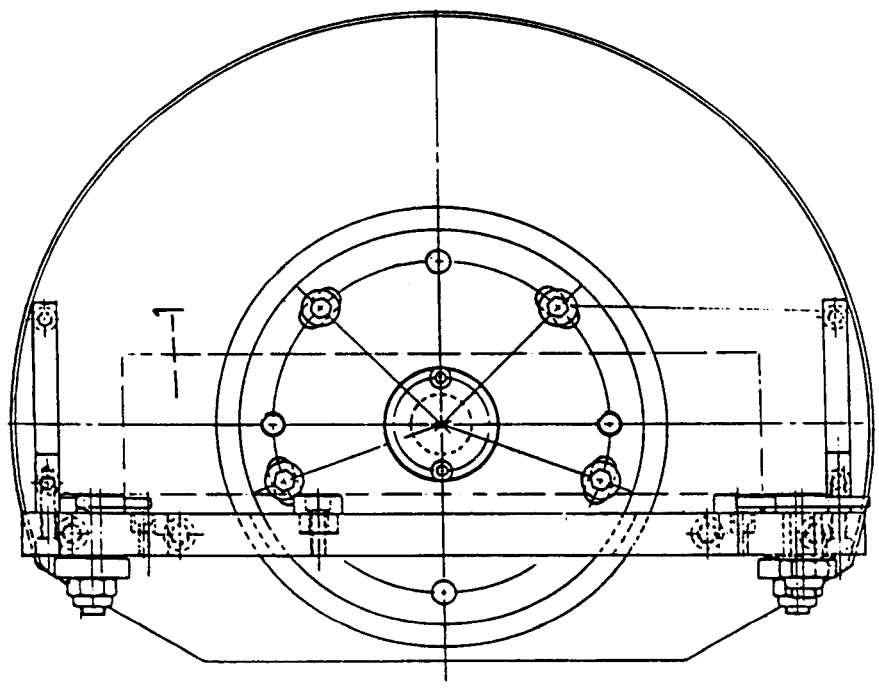

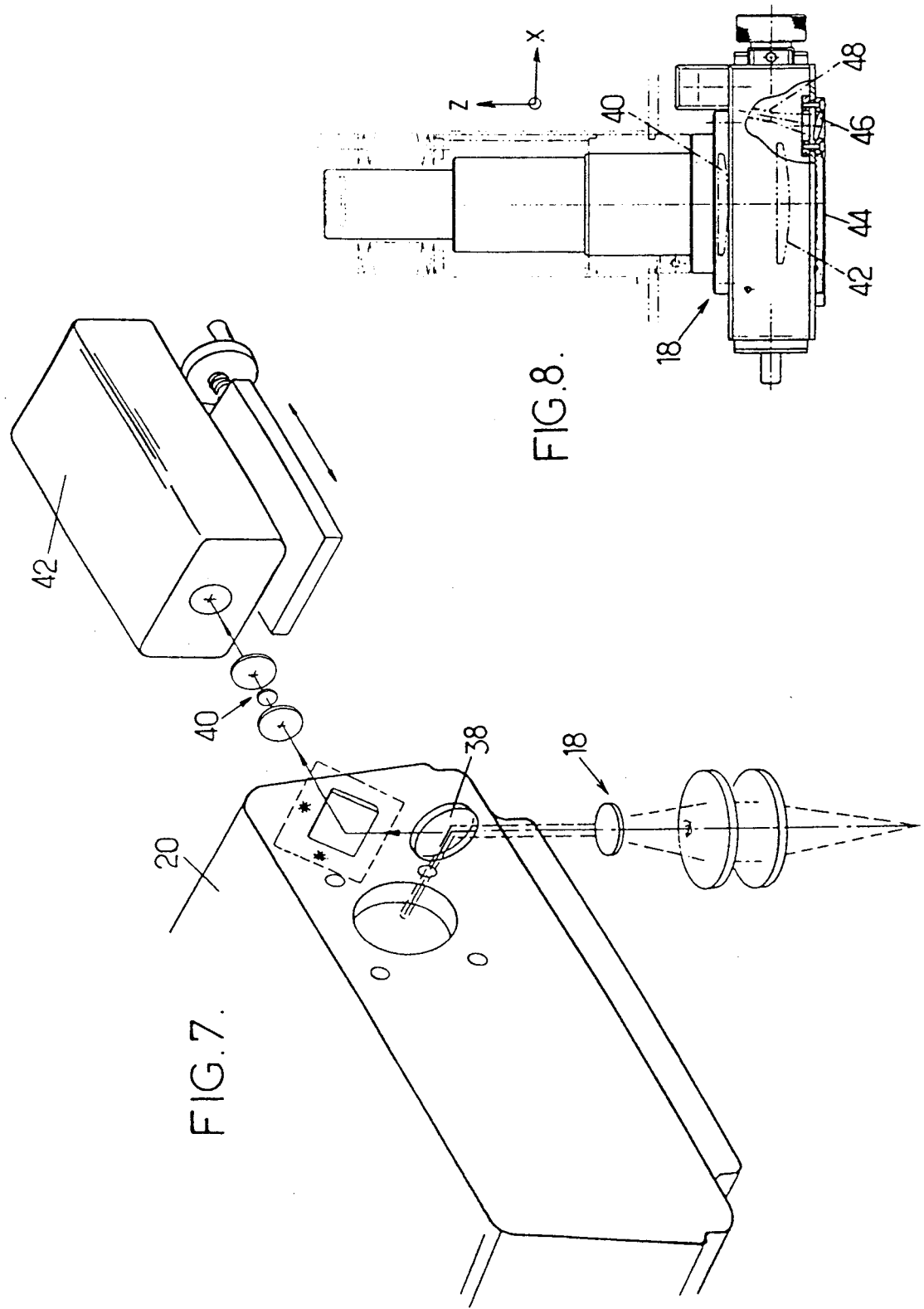

METHOD FOR MANUFACTURING GRIDS FOR A NUCLEAR FUEL ASSEMBLY

This application is a continuation of application Ser. No. 07/695,905, filed May 6, 1991 now abandoned.

BACKGROUND OF THE INVENTION

The invention relates to a method for manufacturing grids to be incorporated in nuclear reactor fuel assemblies. It is particularly suitable for the manufacture of grids for assemblies whose framework comprises end pieces connected by guide tubes imprisoned in some of the cells of grids spaced apart evenly along the guide tubes, the other cells of the grids supporting the fuel rods of the assembly.

Among such grids, reference will particularly be made to those whose major faces have a square shape and which comprise two sets of inner plates disposed in two orthogonal directions and interlocked together so as to define the elementary cells through which the fuel rods and the guide tubes pass. The inner plates are connected at their peripheries, to plates forming a belt. These component parts are secured together at their intersections to provide cohesion of the grids.

Grids are also known, particularly for under-moderated reactor assemblies, which have a hexagonal cross-section and which comprise three sets of intersecting plates. Although particularly advantageous in the case of grids whose major faces have a square shape and whose cells are distributed above the nodes of the square lattice, the invention also applies to grids whose major faces have a hexagonal shape.

The component parts of the grids have generally been secured together by manual brazing, which is a long and tedious operation and which, in addition, does not guarantee fully satisfactory reproducibility.

Different methods and devices have however been proposed for welding the component parts together in a more or less automatic way.

The invention relates to a method of the kind described in French Patent No. 2,522,560, in which the grid whose component parts are to be secured together is placed in a mechanical shaping and holding frame having passages for access to the points to be welded on the two major faces and on the sides of the grid; the frame containing the grid is gripped by a device, placed in a gas-tight chamber containing an inert gas atmosphere; weldings is carried out on one face at a time, using a laser beam orthogonal to the axis of rotation of the device, delivered by a laser generator placed outside the chamber and penetrating thereinto through a transparent window. The operation is then repeated on the other faces after manually repositioning the grid.

By welding in an inert gas protective atmosphere, oxidation of the welds is avoided, which makes it possible, in particular, to apply the method not only to grids made of a high strength alloy, such as INCONEL, but also to grids whose components are made of a zirconium-based alloy.

From a reading of French Patent No. 2,522,560, it seems that the protective atmosphere is obtained by scavenging, which involves considerable inert gas losses. The laser generator is held fixed during welding of a face, except for the welds carried out on the belt, for which the beam is deflected by means of a set of mirrors. The variety of accurate movements of the grids inside the chamber does not guarantee sufficient accuracy to be compatible with the very small size of the focus spot of the laser beam. In addition, the chamber must have a very large volume.

FR-A-2532216 and EP-A-0102252 also describe a method for welding using a fixed laser generator. The laser beam is directed and focussed in an open chamber, subjected to argon scavenging, in which a grid is driven with orthogonal displacement movements. This method requires very considerable gas flows, collection of the gases polluted by the laser shots is difficult and controlling leaks in the open chamber requires very reduced clearances, which are difficult to obtain.

U.S. Pat. No. 4,710,606 describes a welding robot in which a laser beam must be moved along five degrees of freedom by mirrors, which implies a great complexity of the mechanism and accumulation of tolerances.

SUMMARY OF THE INVENTION

An object of the invention is to provide a method for welding grids by laser beam of the type defined above, for sequentially and automatically making the required welds under conditions ensuring mechanical holding of the parts and absence of deformations and oxidation, while avoiding complex movements of a kind likely to adversely affect the welding accuracy due to cumulative lost motions.

To this end, there is provided a method of the above-defined type, wherein, for making the welds on one face of the grid, the laser beam is moved in two directions orthogonal to each other and to the direction of the beam, while the frame is held stationary in the inert gas atmosphere chamber.

It is consequently possible to distribute the movements between the laser beam, the required focussing optical system and the frame.

Although this method is of particular advantage in the case of grids whose plates and belts are made of zirconium-based alloy, it can also be used in the case of grids whose component parts are made of a nickel-chrome base alloy or of steel.

In a typical embodiment of the invention, each grid is placed first of all in a first chamber having a device for orientation of the grid about a first axis, and all welds are effected on the faces parallel to this axis; then the grid still contained in its frame, is placed in another chamber having a device for orientation about an axis which is parallel to the first one, but on which the grid is placed in an angular position perpendicular to that which it had in the first device, and welding is carried out on the major faces.

This arrangement considerably simplifies the orientation devices, and thus provides greater positioning accuracy. On each face, welding is carried out in the same plane, i.e. without modification of the distance to the laser generator, except for particular welds, such as the corner welds of the grid.

Since the grid remains in its frame from the beginning to the end of the welding operations, transfer from one chamber to the other does not disturb the relative position of the component parts of the grid.

Unloading of one grid, loading of another grid to be welded and provision of inert atmosphere in a chamber may take place during welding of the grid occupying the other chamber, i.e. in overlapping time.

In practice, the inert gas atmosphere may be created by pumping out the chamber until a primary vacuum is obtained, then filling with inert gas so that the atmosphere in which welding takes place contains less than 50 vpm of oxygen. To protect the windows from the alternating pressure stresses, they may be protected by lids during evacuation.

It is often of advantage to form some at least of the welds by shots focussed in two points located on two parallel lines at a short distance from each other. To that end, the optical path of the laser beam may be defined by optical means, such as mirrors or lenses, which are vibrated. Then the vibrations of the focussing lens are synchronized with the laser pulses, so that each shot takes place when the optical path is oriented towards the point which is to receive the energy.

The invention also provides an installation for laser welding the different component parts of the grid, comprising a controlled atmosphere enclosure having a device for angular adjustment about an axis, receiving a frame containing a grid to be welded and having a transparent window and comprising a welding laser source carried by a table with crossed movements in two orthogonal directions one of which is parallel to the axis of angular adjustment.

BRIEF DESCRIPTION OF THE DRAWINGS

The invention will be better understood from the following description of a particular embodiment, given by way of example.

FIG. 1DD shows a modification of FIG. 1D;

FIG. 3 is a left hand view of the installation of FIG. 1, showing the framework of the installation and the elements it carries;

FIG. 4 is a front view of FIG. 1, showing the welding chambers and the part of the framework which carries them;

FIG. 5 is a front elevation view on an enlarged scale showing the positioning device contained in the firs welding chamber of the installation;

FIG. 5A is a sectional view through line VA--VA of FIG. 5, showing the plate of the positioning device of the first welding chamber;

FIGS. 6 and 6A, similar to FIGS. 5 and 5A, show the positioning device of the second welding chamber;

FIG. 7 is a perspective diagram showing the path of the laser welding beam;

FIG. 8 shows a possible construction of a focussing optical system for also causing the optical path to oscillate;

DETAILED DESCRIPTION OF A PREFERRED EMBODIMENT

Figures 1, 1B:
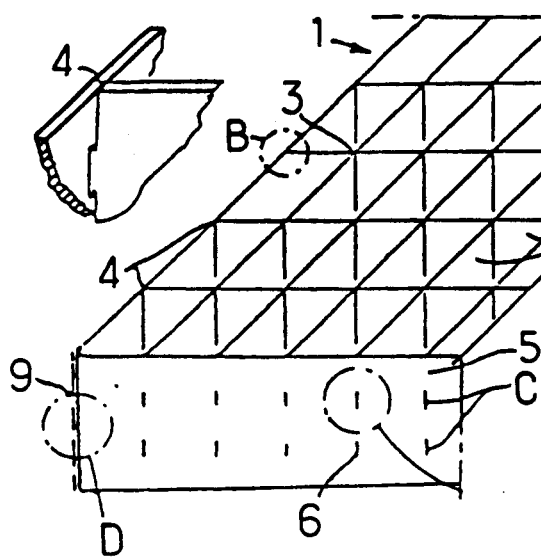
FIG. 1 is a perspective schematic view showing a portion of a grid to which the method of the invention can be applied.
FIGS. 1A, 1B, 1C, 1D are diagrams on an enlarged scale showing the locations indicated by circles bearing the references A, B, C and D in FIG. 1.

The installation which will now be described can be used particularly for mutually welding the components of a grid 1 of the kind shown in FIG. 1, which may have the construction described in detail in EP-A-0 159 228 or FR-A-2 474 229. Grid 1 comprises two intersecting sets of mutually interlocked elementary plates 2. A securing weld 3, called "type A", the detail of which is shown in FIG. 1A, secures the plates together at each intersection, on each of the two major faces of grid 1. The edges of plates 2 form, with peripheral plates 5 forming the belt, a T-shaped intersection which receives, on each face, a weld 4 called "type B", shown in FIG. 1B.

Plates 2 comprise at their ends, lugs which are engaged in slots formed in the plates 5 of the belt. Each end may in particular comprise two or three lugs 7 engaging in respective slots 8 (FIG. 1C). The lugs, some of which may be deformed so as to provide mechanical locking, are fixed by edge welds called "type C".

Finally, welding beads 9 secure the elements of the belt by connecting flanged edges 10 formed at the ends of the peripheral plates 5. These welds, shown in FIG. 1D, are said to be "of type D". The "type D" welds may be replaced by edge-to-edge welds, as shown in FIG. 1DD.

Figure 1A:
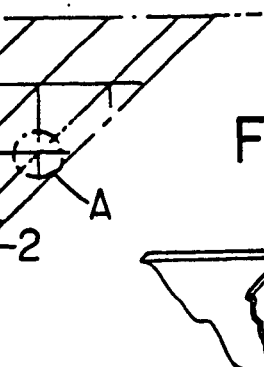
Figure 1C:
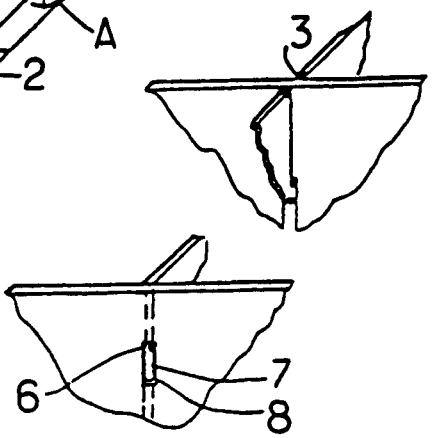
Figure 1D:
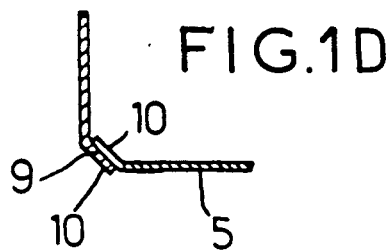
Figure 1E:
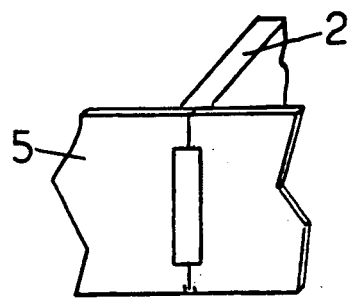
FIG. 1E shows a method of fixing the belt forming a modification of FIG. 1D.
Figure 1D:
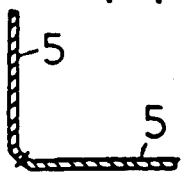

In some cases, the plates forming the grid are not fixed by lab welding, but by edge-to-edge welding at location confronting internal plate 2 (FIG. 1E). This type of weld is generally formed at the second internal plate from a corner of the grid, for making it possible to shape the plate defining the pocket situated at the corner of the grid.

Figure 2:
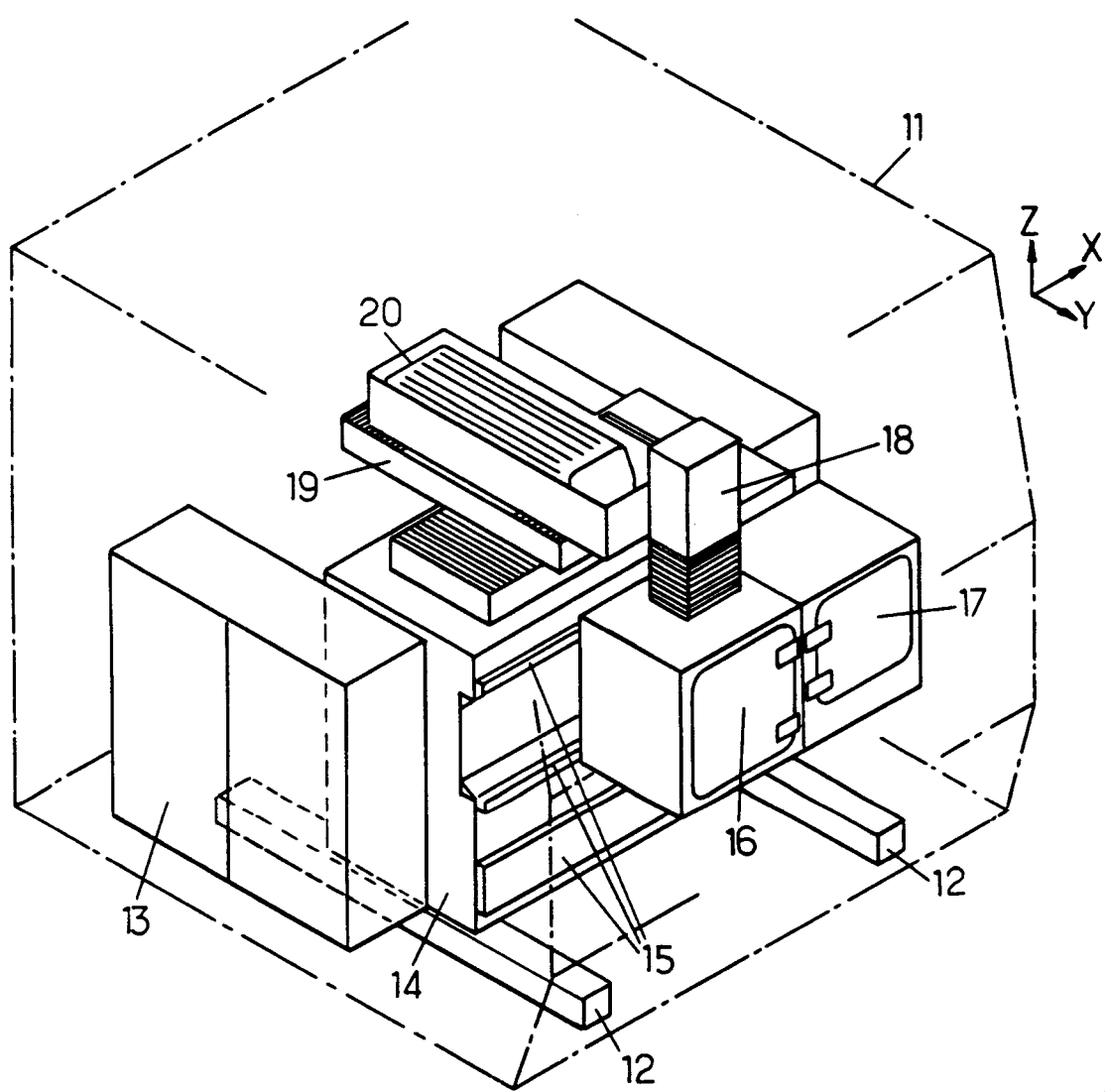
FIG. 2 is a perspective diagram showing the relative arrangement of the main components of an installation according to the invention.

The installation shown in FIG. 2 and the succeeding figures is suitable for satisfactorily carrying out the numerous spot welds required for forming a grid of the kind shown in FIG. 1.

In order to hold all components of grid 1 in a mutually correct position, each assembled grid is first of all placed in a frame for holding the components of the grid in a well-defined position and for building a unit which can be handled and brought into all the orientations required for welding. The frame may be as described in document EP-A-0 159 228, to which reference may be made.

The installation, whose general construction is shown in FIG. 2, is contained in a cell 11 whose front face is equipped with movable transparent panels giving access to the enclosure for loading/unloading. The installation comprises a support structure having a beam 12 which supports cabinets containing the electric supply means and the circuits for regulating and controlling the welding operations in accordance with a prerecorded program and a framework 14 which carries the different movable components. On framework 14 are fixed slides 15 (FIGS. 2 to 4), disposed horizontally in a direction X, on which a main carriage 21 and an auxiliary carriage 22 placed underneath can move. The carriages are connected together by an arm 24. The main carriage 21 carries two welding chambers 16 and 17 fixed side-by-side, each having a front door for introducing and removing grids. The auxiliary carriage 22 carries means for conditioning the atmosphere of the chambers and particular the vacuum pump. Carriages 21 and 22 are movable among axis X. They are driven by a thruster and are precisely positioned by stops having dampers.

The ceiling of each of chambers 16 and 17 comprises a window which is transparent for the welding radiation. The radiation is delivered by a laser source carried by a table with crossed movements and along direction X and along the horizontal direction Y orthogonal to X.

The laser generator may be regarded as comprising a laser properly speaking 20 and an optical system 18 for reflecting along the vertical direction Z and for focussing at an adjustable distance. The laser may be carried by a cradle 26 fixed to the upper plate 25 of the crossed movement table 19.

For welding zirconium alloy grids, a 400 W pulse YAG may be used. A range of movement of 400 mm along X and along Y is sufficient to effect all the welds of a fuel assembly grid for a pressurized water reactor of the kind used at the present time. An example of a focussing optical system 18 for adjusting the focal point so that it is exactly at the position of the weld to be executed will be described hereinbelow.

Chamber 16 is provided with a device 27 for angular control about an axis parallel to direction Y, whose purpose is to receive a grid contained in its frame for carrying out type C and type D (or DD or E) welds. That chamber is shown in FIG. 4 in a position where its entrance window is situated under the zone scanned by the movement of the laser beam, for effecting the welds on the grid contained in the chamber.

The plate 35 of device 27 which holds in position a grid contained in its frame and gives it the eight orientations required for carrying out type C (and possibly E) welds, as well as type D or DD welds, when they exist at the four corners of the grid, passes through the rear wall of chamber 16. In other words, the purpose of device 27 is to bring the grid into the four angular positions required for carrying out welds C, possibly E, on the four faces of the belt and, in other cases, the four additional angular positions required for making welds at the corners of the grid.

In all cases, the major faces of the grid will be parallel to direction Z, i.e., to the path of the laser beam during welding. By adjusting the working distance, not only type C spot welds, but also welding beads of type D or DD, can be carried out, when the latter are to be made.

The orientation device 27 comprises a circular plate 29 equipped with cams 30 for fixing the frame template 32 containing, the grid, whose periphery is shown schematically in broken lines in FIGS. 4, 5 and 5A. The two cams 30 apply the frame against positioning pins 31 and against the plate. The pivoting parts of the frames pivot in crescent shaped grooves 33 formed in the frame.

Plate 29 is fixed to a disk 35, which is secured by the output shaft to a drive motor (not shown) equipped with an encoder giving an indication as to the angular position to cabinets 13.

Chamber 17 is also equipped with an orientation device 28, shown in FIGS. 6 and 6A. This device again comprises a plate 29a fixed to a disk 35a for angular control about an axis parallel to direction Y. But plate 29a receives the frame in a position in which the major faces of the grid and two of the sides are parallel to the orientation axis. To that end, plate 29a is fixed directly to disk 35 and a base 36 carrying cams 30a and pins 31a, which is orthogonal to the plate. In base 36 is formed an opening 37 of sufficient size to allow access to all spot welds to be carried out on the major face of the grid which is turned towards the base.

The laser source may have the construction shown schematically in FIG. 7. The beam delivered by the laser 20 is reflected by a dichroic mirror 38 towards the focussing optical system 18 formed of several lenses. The set of lenses is mounted in a motor-driven mount and movable along axis Z by a distance of 200 mm, so that the working distance may be adjusted to an optimum whatever the welds to be carried out.

For such adjustments, the image of the position to be welded, taken up by the optical system 18 and passing through the dichroic mirror 38, is picked up by a CCD camera which transmits this image to a monitor forming part of the control panel. The operator may then focus by means of a mechanism (not shown) until a clean image in visible light is obtained, indicating a correct working distance. Since the movements of the optical system 18 along axis Z are controlled by the control electronics, adjustment of the working distance is in fact automatic.

The optical system 18 may have the construction shown in FIG. 8. This optical system 18 comprises a mount supporting three lenses 40, 42 and 44. The lenses 40 (divergent) and 42 (collimating) form a x2 focal telescope for reducing the divergence of the beam. Lens 44 focusses the beam on the spot to be welded. In addition, lens 44 is mounted on a slide causing it to oscillate in direction X by an amount corresponding to the desired distance between the spots to be welded, so as to form weldings of type C, D or E.

The amplitude of movement may, for example, be adjustable from 0 to 2 mm, and the oscillating movement may be given by electro-magnets moving the slide between adjustable stops.

The case shown in FIG. 8 further comprises means for illuminating the position where firing is to take place, formed by lens 46 focussing the output beam of two optical fibers 48 fed with light by a generator (not shown).

In a modification of the invention, the two chambers 16 and 17 are fixed and the compound movement table is mounted on means for bringing the laser generator successively above chambers 16 and above chambers 17.

To reduce the consumption of inert gas, the installation is advantageously adapted to replace the air by gas, not by scavenging, but by evacuating and then filling.

Evacuation seems at first glance infeasible, for glass windows probably could fail under the pressure forces applied during evacuation.

This problem is solved, in the embodiment shown in FIGS. 4, 4A, 9 and 10, by mounting, on the frame of the installation, lids to be applied around the windows during evacuation and balancing the pressure which prevails on the opposite faces of the windows.

Lids 50 and 52 are used alternately, and are applied against the window of that chamber which is not in alignment with the optical system of the laser. To that end lids 50 and 52 are connected to a support frame 54 by respective control mechanisms. The mechanism shown schematically in FIGS. 3, 4 and 9 comprises inflatable cushions 56 inserted between a bearing plate 57 fast with the frame and a shoe 58 fixed to the lids. The shoes are guided by rods 60 sliding in the bearing plate 57 and urged towards an upper position by springs 62. Downward movement of shoes 58 and of the covers is limited by abutment of nuts 64, screwed onto a threaded end portion of rods 60, against plates 57.

Figure 4A:
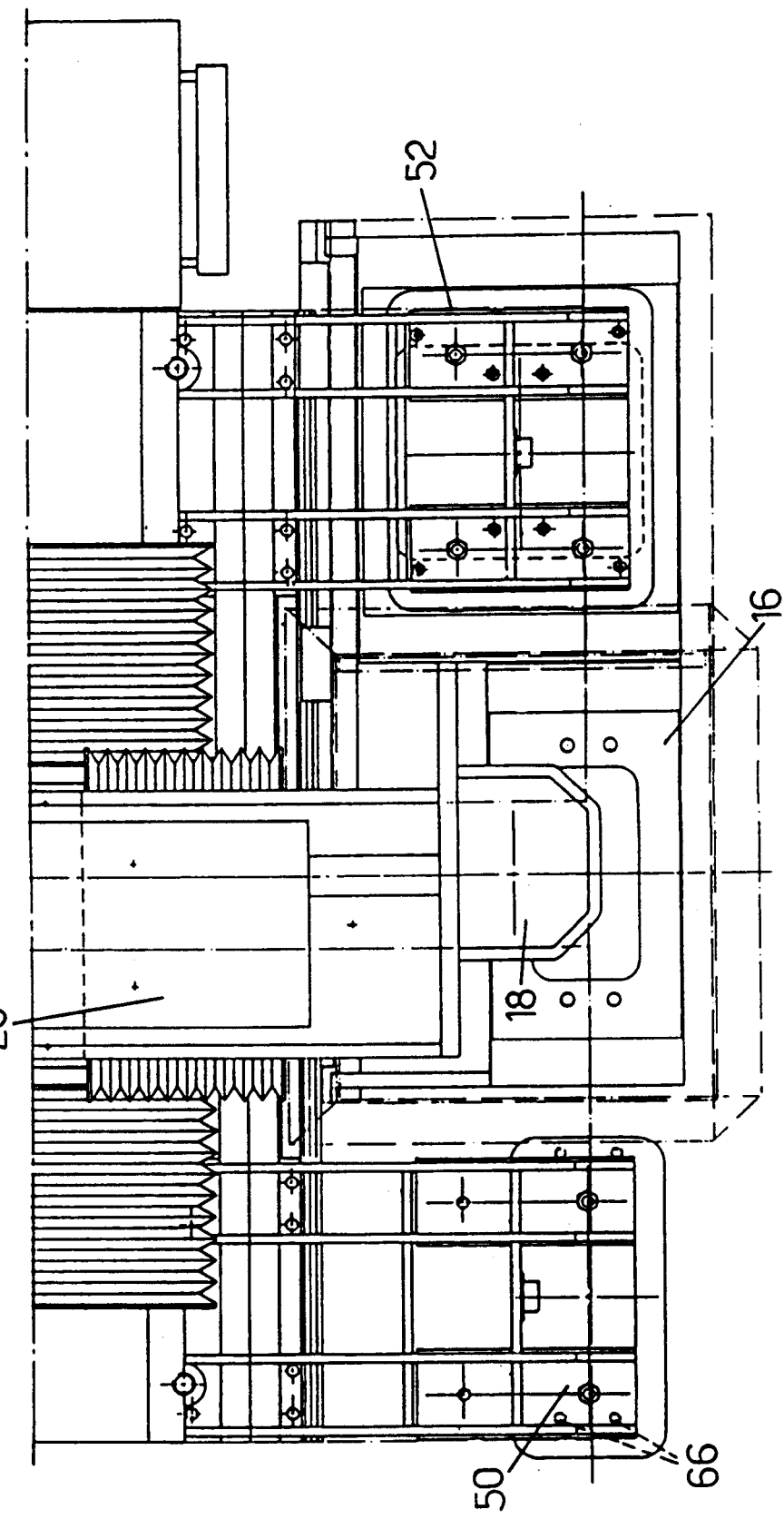
FIG. 4A is a top plan view of a fraction of the installation of FIG. 1.
Figure 9:
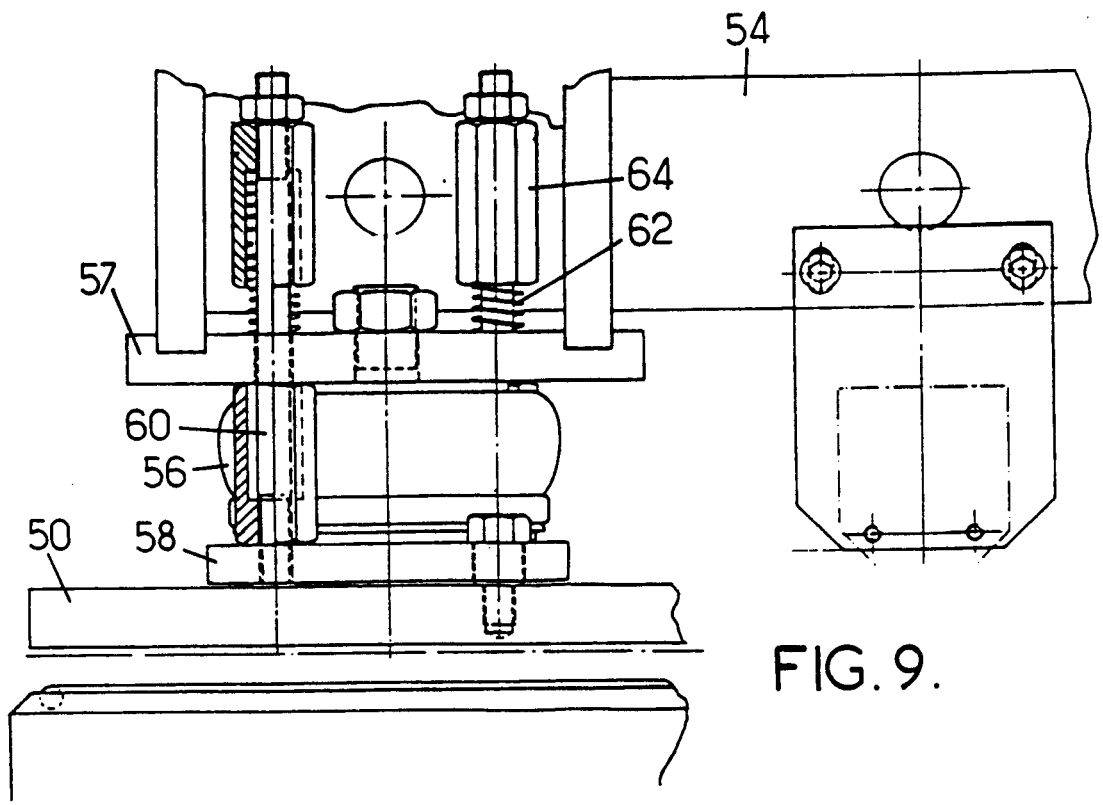
FIG. 9 is an enlarged front elevation view, in partial cross-section, showing the means for pressing the protection lids.
Figure 10:
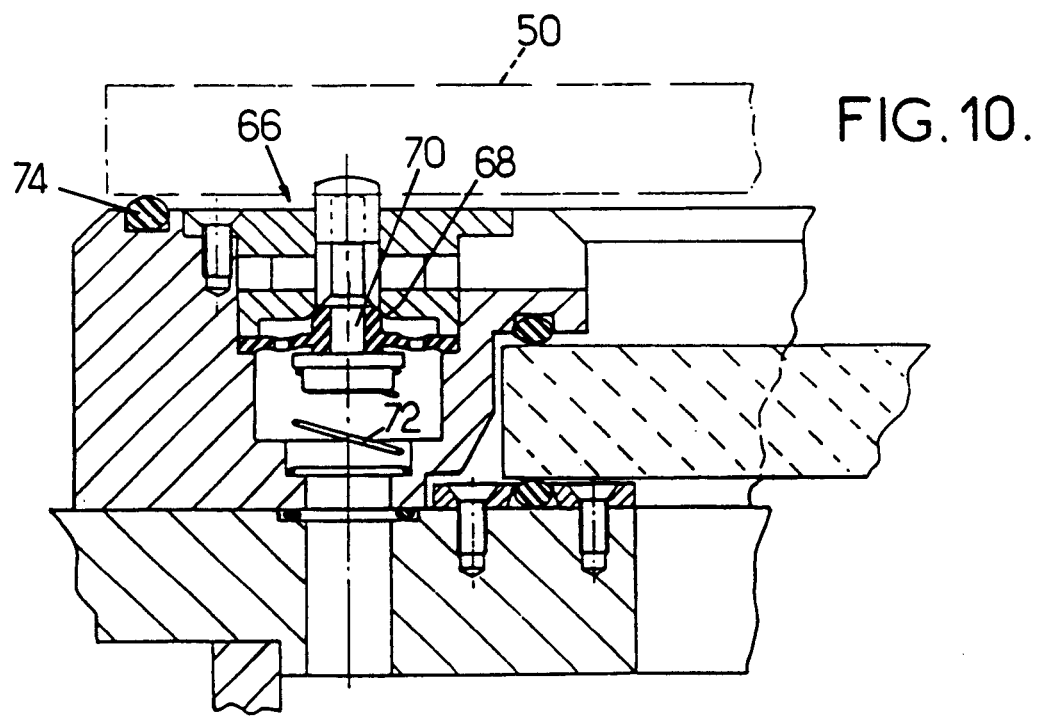
FIG. 10 is an enlarged detail view, in cross-section, of a balancing valve.

Each window is provided with several balancing valves occupying, for example, the positions shown at 66 in FIG. 4A, for one of the windows. Each valve comprises a passage formed in the wall of the chamber, a portion of which is defined by a seat 68. The seat is arranged for receiving a closure member 70, urged by a spring 72 to its closed position. In closed position, the closure member 70 has a portion projecting above the wall of the chamber. This wall carries an annular seal 74 encircling all valves. When lid 50 is applied against seal 74, it forces down the closure members and connects the inside of the chamber with the space between the window and the lid. The communication is closed as soon as the lid is removed.

The method may be carried out as follows in the apparatus shown in FIGS. 2 to 8.

The assembled plates of a grid are placed in a frame which forms a template holding the plates in a well-defined position relative to each other. A first sequence of operations is provided for welding the belt. To that end, frame 32 containing the grid is placed on plate 29 in chamber 16 and locked by means of cams 30. Chamber 16 is closed. The lid protecting the window of chamber 16 is applied against the wall of the chamber for balancing the pressures on each side of the window. The inside of the chamber is evacuated to a primary vacuum by means of the pump of the conditioning device 23, and is then filled with argon. Two pumping and filling sequences are sufficient to obtain a sufficiently pure atmosphere, whose oxygen content is less than 50 vpm and whose content is less than 150 vpm. The lid may then be raised. The overpressure in the chamber may be 40 mbars and is maintained with an argon flow of 20 to 60 l/mn for removing the welding flues appearing in the chamber. Advantageously the installation comprises means for analyizing the argon which exits through a vent, for checking that the oxygen and humidity contents do not exceed the above-mentioned thresholds.

Chamber 16 being held fixed on its slides under the optical system 18 type C and D (or E) welds may be carried out automatically. The laser is directed to each welding position by means of the cross-movement table 19. Advantageously, type D or E welds are carried out first type D welds requiring a working distance different from type E welds. Each weld may be formed with energy between 14 and 22 Joules per pulse, at a rate of 7 to 16 Hz, the pulse time duration being about 5 ms.

Type C welds may be achieved with parameters of the same order of magnitude as those required for the D and E beam welds.

While welding takes place automatically, without movement of chambers 16 and 17, the operator may introduce in chamber 17 a second grid, on which type A and B welds remain to be executed. The time required for loading chamber 17 and for conditioning the atmosphere thereof is less than that for welding in chamber 16.

When the welds to be executed in chamber 16 are completed, carriages 21 and 22 are moved over their slides automatically, under the control of the electronics contained in cabinets 13. Following such movement, the window of chamber 17 is under the optical system of 18. Chamber 16 is then opened and the grid which occupied it is removed and replaced by a new grid, while type A and B welds are effected.

The latter welds require movements of the laser generator by means of table 19 in the two directions X and Y. Each weld may generally be provided by one or two pulses of a duration of about 5 ms, at a frequency of 5 to 10 Hz and with a total energy of 14 to 24 Joules per pulse.

The welds are first of all made on a major face, then on the other, after plate 29a has been pivoted through 180°.

We claim:

1. A method for manufacturing a grid for a nuclear fuel assembly, said grid having two sets each consisting of mutually parallel inner plates, the plates of one set being at an angle with the plates of the other set, and a belt welded to end portions of said inner plates and forming side faces of said grid, comprising the steps of:

placing said inner plates and said belt of a grid in assembled condition in a holding frame having passages for access to points to be welded on two major faces and on the side faces of the grid;

gripping the holding frame containing the grid with a first device placed in a first closable chamber having a transparent window and rotatable about an axis parallel to said side faces;

closing said chamber and creating an inert gas atmosphere therein;

executing all welds on one face of the grid parallel to said axis using a laser beam orthogonal to said axis of rotation and originating from a laser generator placed outside the chamber and delivering a beam which penetrates into the chamber through said transparent window, said laser beam being moved along two directions orthogonal to each other and to the direction of said beam while the frame is held stationary in the chamber for executing said welds on said one face;

repeating the welding operations on at least another of said faces of the grid which are parallel to the axis after angularly repositioning the device for exposing said another of said faces;

removing the frame and grid from said first chamber and gripping said frame with a second device placed in a second closable chamber having a transparent window and rotatable about a axis parallel to at least two faces of said grid other than said four of said major faces and side faces;

creating an inert gas atmosphere in said second chamber;

executing all welds on one face of the grid parallel to the axis of said second device using a laser beam orthogonal to said axis of said second device and originating from said laser generator placed outside the chamber and delivering a beam which penetrates into the chamber through said transparent window, said laser beam being moved along two directions orthogonal to each other and to the direction of said beam while the frame is held stationary in the chamber for executing said welds on said one face; and repeating the welding operations on other of said faces until all welds have been completed.

2. Method according to claim 1, wherein one frame carrying a grid is unloaded from one of the chambers, another grid to be welded is loaded in the chamber and an inert gas atmosphere is created in the chamber while another grid in the other, chamber is being welded.

3. Method according to claim 2, wherein some of said welds are carried out with laser shots focussed in two points located on two parallel lines at a short distance from each other.

4. Method according to claim 3, wherein the optical path of the laser beam is defined by optical means which are vibrated in synchronism with the pulses of the laser.

5. Method according to claim 2, wherein the inert gas atmosphere is created by pumping out the chamber until a primary vacuum is obtained, then filling with inert gas while the window is protected from the alternating pressure stresses by lids.

6. Method for manufacturing a grid for a nuclear fuel assembly, said grid having two sets each consisting of mutually parallel inner plates, the plates of one set being disposed at an angle to the plates of the other set, and a belt welded to end portions of said inner plates and forming side faces of said grid, said method comprising the steps of:

placing said inner plates and said belt of a grid in assembled condition in a holding frame having passages for access to points to be welded on two major faces and on said side faces of said grid;

gripping said holding frame containing said grid with a first device placed in a first closable chamber having a transparent window and rotatable about an axis parallel to said side faces;

closing said chamber and creating an inert gas atmosphere therein;

locating a carriage carrying said chamber in a working area of said laser generator;

executing all welds on one face of said grid faces using a laser beam directed orthogonally to an axis of rotation of the device parallel to said one side face, originating from a laser generator placed outside said chamber and delivering a beam which penetrates into said chamber through said transparent window, said laser beam being moved along two directions orthogonal to each other and to the direction of said beam while said frame is held stationary in said chamber for executing said welds on said one face for executing said welds on said one side face;

repeating the welding operations on the other ones of said side faces of said grid which are parallel to the axis after angularly repositioning said device for exposing said other faces in succession;

moving said carriage out of the laser working area in a direction transverse to said beam;

removing said frame and grid from said first chamber and gripping said frame with a second device placed in a second closable chamber having a transparent window, carried by said carriage and rotatable about an axis parallel to at least said two major faces of said grid;

creating an inert gas atmosphere in said second chamber;

moving said carriage to bring said second chamber into said working area; and executing all welds on one major face of said grid parallel to the axis of said second device using a laser beam orthogonal to said axis of said second device and originating from said laser generator placed outside said chamber and delivering a beam which penetrates into said chamber through said transparent window, said laser beam being moved along two directions orthogonal to each other and to the direction of said beam while said frame is held stationary in said chamber for executing said welds on said major face and repeating the welding operations in said second of said faces after angularly repositioning said device for exposing said other face.

* * * * *